US007685165B2

(12) United States Patent
Gopisetty et al.

(10) Patent No.: US 7,685,165 B2
(45) Date of Patent: Mar. 23, 2010

(54) POLICY BASED RESOURCE MANAGEMENT FOR LEGACY DATA

(75) Inventors: Sandeep Gopisetty, Morgan Hill, CA (US); Norman Jerome Pass, Sunnyvale, CA (US); Ramani Routray, San Jose, CA (US); Aameek Singh, Smyrna, GA (US); Gauri Shah, Santa Clara, CA (US); Sandeep Uttamchandani, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/907,427

(22) Filed: Apr. 1, 2005

(65) Prior Publication Data

US 2006/0224550 A1 Oct. 5, 2006

(51) Int. Cl.
*G06F 12/00* (2006.01)
(52) U.S. Cl. .................................... 707/200; 707/104.1
(58) Field of Classification Search .......... 707/1–104.1, 707/200
See application file for complete search history.

(56) References Cited

U.S. PATENT DOCUMENTS

| 4,558,413 | A  | * | 12/1985 | Schmidt et al. ............. 707/203 |
| 6,275,818 | B1 | * | 8/2001  | Subramanian et al. ......... 707/2 |
| 6,332,163 | B1 |   | 12/2001 | Bowman-Amuah ......... 709/231 |
| 6,539,026 | B1 | * | 3/2003  | Waclawsky ................. 370/428 |
| 6,637,013 | B1 | * | 10/2003 | Li ............................... 716/5 |
| 6,721,747 | B2 |   | 4/2004  | Lipkin ......................... 707/10 |
| 6,757,689 | B2 |   | 6/2004  | Battas et al. ................ 707/101 |
| 6,826,609 | B1 | * | 11/2004 | Smith et al. ................. 709/225 |
| 6,983,317 | B1 | * | 1/2006  | Bishop et al. ............... 709/223 |
| 2002/0178271 | A1 | * | 11/2002 | Graham et al. .............. 709/229 |
| 2003/0060913 | A1 | * | 3/2003  | Turner et al. ................ 700/103 |

(Continued)

FOREIGN PATENT DOCUMENTS

GB       2412760 A  * 10/2005

(Continued)

OTHER PUBLICATIONS

Chandra et al., "Resource Management for Scalable Disconnected Access to Web Service," *Proceedings of the 10th International Conference on World Wide Web*, May 1-5, 2001, Hong Kong, Hong, Kong, pp. 245-256.

(Continued)

*Primary Examiner*—James Trujillo
*Assistant Examiner*—Linh Black
(74) *Attorney, Agent, or Firm*—IP Authority, LLC; Ramraj Soundararajan; Van Nguy

(57) ABSTRACT

A policy-based resource management system provides an infrastructure that uses high-level definitions of data-types along with desired policy rules to manage legacy data. In particular, relevant legacy data is identified as well as the characteristics of storage devices where the legacy data resides. The storage management system determines what if any of the legacy data is stored in a manner that is non-compliant with the policy rules and corrects any violations. It generates corrective action plans, and then uses existing data migration software to migrate the data. Accordingly, the legacy data may be managed in a policy-based manner without requiring typical storage management software.

13 Claims, 2 Drawing Sheets

U.S. PATENT DOCUMENTS

| | | | |
|---|---|---|---|
| 2004/0059920 A1* | 3/2004 | Godwin | 713/183 |
| 2004/0210320 A1* | 10/2004 | Pandya | 700/1 |
| 2005/0010612 A1* | 1/2005 | Enderwick et al. | 707/201 |
| 2005/0091518 A1* | 4/2005 | Agarwal et al. | 713/193 |
| 2005/0097260 A1* | 5/2005 | McGovern et al. | 711/100 |
| 2005/0108518 A1* | 5/2005 | Pandya | 713/151 |
| 2005/0169467 A1* | 8/2005 | Risan et al. | 380/201 |
| 2005/0195660 A1* | 9/2005 | Kavuri et al. | 365/189.05 |
| 2006/0101095 A1* | 5/2006 | Episale et al. | 707/204 |
| 2006/0112299 A1* | 5/2006 | Urmston et al. | 714/5 |
| 2007/0180490 A1* | 8/2007 | Renzi et al. | 726/1 |

FOREIGN PATENT DOCUMENTS

| | | | |
|---|---|---|---|
| WO | WO 2005043323 A2 * | 5/2005 | |
| WO | WO 2005078606 A2 * | 8/2005 | |

OTHER PUBLICATIONS

Bradshaw et al., "Representation and Reasoning for DAML-Based Policy and Domain Services in KAoS and Nomads," *Proceedings of the Autonomous Agents and Multi-Agent Systems Conference (AAMAS 2003)*, Jul. 14-18, 2003, Melbourne, Australia, pp. 835-842.

* cited by examiner

POLICY BASED RESOURCE MANAGEMENT FOR LEGACY DATA

BACKGROUND OF THE INVENTION

The present invention relates generally to the field of computer-based data storage. More specifically, the present invention is related to policy-based management of electronic data.

DISCUSSION OF PRIOR ART

In the recent past computer-based data storage has become more and more common for a wide variety of data as computers become more prevalent in business and other aspects of modern life. Not only are documents being stored, but audio, video, and image files are being stored as are e-mail messages, spreadsheets, databases, etc. Additionally, as new data storage devices are being developed, some data may be stored on optical media, magnetic disks, magnetic tape, network-attached storage, and other types of hardware. As more time passes, the volume of electronic data, the different types of electronic data, and the different types of storage devices have continued to grow and will continue to grow and expand.

Efficient management and control of data and data storage have, therefore, become a priority and various techniques and strategies have previously been employed and are currently employed to address these issues. In particular, a number of different policy-based storage resource management systems have recently been developed that address some of the issues related to storage management. In such a typical system, high-level policies are specified by system administrators that control how data is stored. The policies usually relate to such characteristics as data availability, retrieval and access performance, data reliability, data security, and storage device utilization.

However, these policy-based storage resource management systems are limited to use within an environment of newly deployed systems and newly created data. In other words, these systems and their policies are created before the data to be managed exists and as data is generated, its storage is managed according to the pre-defined policies. The term "policies", as used in the context of managing data storage, is a fairly broad term that refers to an identification of desired properties that should be applied to data. There are product specific ways to define properties as well as competing attempts to define industry standards. For example, the IETF standards define a Policy Core Information Model (Moore, B., E. Ellesson, et al. 2001. Policy Core Information Model—Version 1, Specification. Network Working Group—RFC3060). In general, all of these approaches defines the "policies" as a collection of rules, where each rules is of the form: Event—Condition—Action. Further refinements of these rules provide for additional features such as techniques for resolving rule conflicts, etc.

There are other products and software applications currently in use that are related to other aspects of data storage management. For example, Tivoli™ includes functionality that is commonly referred to as the Storage Resource Manager that is capable of collecting details of data objects, their storage locations, and attributes about the data objects. Additionally, numerous search engines (both at the intranet and internet level) and information retrieval tools are available to perform user-initiated queries on a variety of specified attributes and return and rank matching entries.

Whatever the precise merits, features, and advantages of these previously attempted approaches, none of them achieves or fulfills the purposes of the present invention.

SUMMARY OF THE INVENTION

Accordingly, aspects of the present invention relate to policy-based storage resource management techniques for legacy systems having existing legacy data. In addition, support is also provided for ongoing policy-based management of new data and new systems as well as future maintenance and management of the legacy systems. A policy-based resource management system provides an infrastructure that uses high-level definitions of data-types along with desired policy rules to manage legacy data. In particular, relevant legacy data is identified as well as the characteristics of storage devices where the legacy data resides. The storage management system determines what if any of the legacy data is stored in a manner that is non-compliant with the policy rules and corrects any violations. Accordingly, the legacy data may be managed in a policy-based manner without requiring typical storage management software.

In particular, one aspect of the present invention relates to a method for implementing policy-based management for legacy data. In accordance with this method a policy associated with one or more data objects is identified wherein each of the data objects is stored on a respective associated storage device. Then, for each associated storage device at least one property related to the policy is determined and any associated storage devices in which the at least one property violates the policy are subsequently identified. Subsequently a plan for the corrective action is generated, and existing data migration tools can be leveraged to correct the policy violation.

DESCRIPTION OF THE PREFERRED EMBODIMENTS

Figure 1:
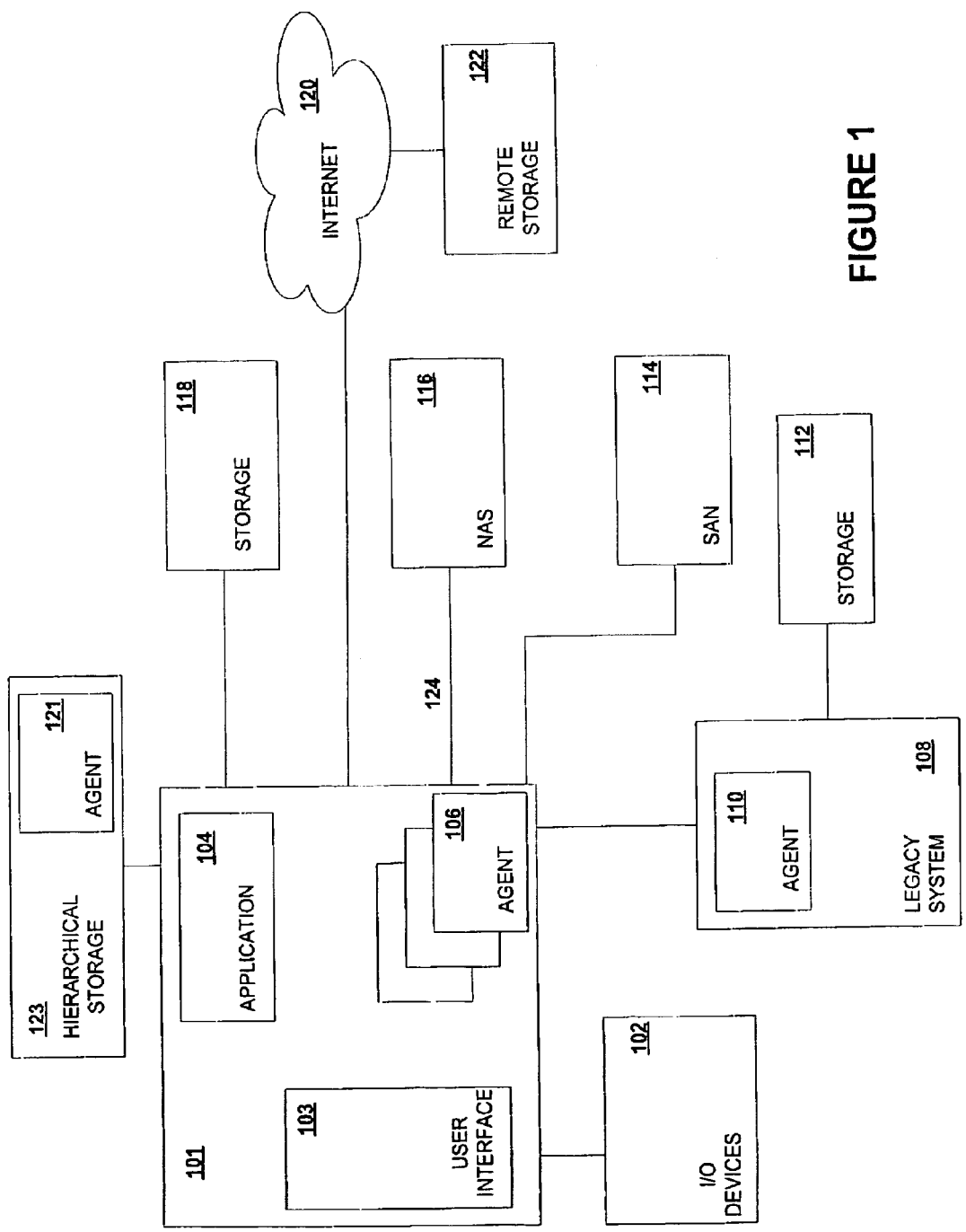
FIG. 1 illustrates an exemplary environment for implementing a policy-based storage resource management system in accordance with the principles of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Additionally, the present invention provides for an article of manufacture comprising computer readable program code contained within implementing one or more modules to implement a policy-based storage resource management. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for managing, according to a set of data storage policies, a variety of legacy data objects stored on different storage devices.

FIG. 1 depicts an exemplary environment for implementing a policy-based storage resource management system in accordance with the principles of the present invention. In this figure, a computer platform 101 implements a storage resource management application 104. The application 104 manages the storage of legacy data objects within the various storage devices depicted according to a set of policies or rules. The application 104 includes a user interface 103 that receives input from, and sends output to, a user via any of a variety of input/output devices 102. Although depicted as residing on the particular computer platform 101, the application 104 may be distributed among a plurality of different platforms or reside on some other platform (i.e., system 108) without departing from the scope of the present invention.

The platform 101 is in communication with, among other things, a number of different storage devices that have stored therein, respective data objects. Some example storage devices include a legacy system 108 that is closely coupled to the platform 101, such as, for example, via a SCSI bus or some other proprietary bus. The storage device 112 is itself coupled to the legacy system 108 via a similar, or different, bus. Other exemplary storage devices include a storage area network 114 that typically includes a plurality of individual magnetic hard drives arranged in various levels of logical and physical volumes. Network attached storage 116 may also be available to the platform 101 via a network connection (e.g., Ethernet) 124.

The platform 101 may have its own individual storage devices 118 that are directly accessed by the platform 101 itself. A more complex storage device is a hierarchical storage system 123 that includes different types of media and automatically migrates data objects to the different media types according to a set of preset rules. One other type of storage device may be a remotely located storage system 122 that is available over a WAN or the Internet 120. In general, the data objects managed by the application 104 can reside on a variety of different storage platforms, all having various characteristics and properties.

The application 104 also includes a number of different agents 106 that are configured to communicate with the different storage devices, as described in more detail later. In some instances, the agents 106 can also communicate with infrastructure devices (e.g., switches, routers, etc.) that are located between the platform 101 and a particular storage device. The agents 106 may communicate with an analogous agent at a storage device (e.g., agent 110 at the legacy system 108, or the agent 121 at the hierarchical system 123). In other instances, the agents 106 or the application 104 itself may communicate directly with a device (e.g. SAN 114) and its well-known API (application programming interface).

Figure 2:
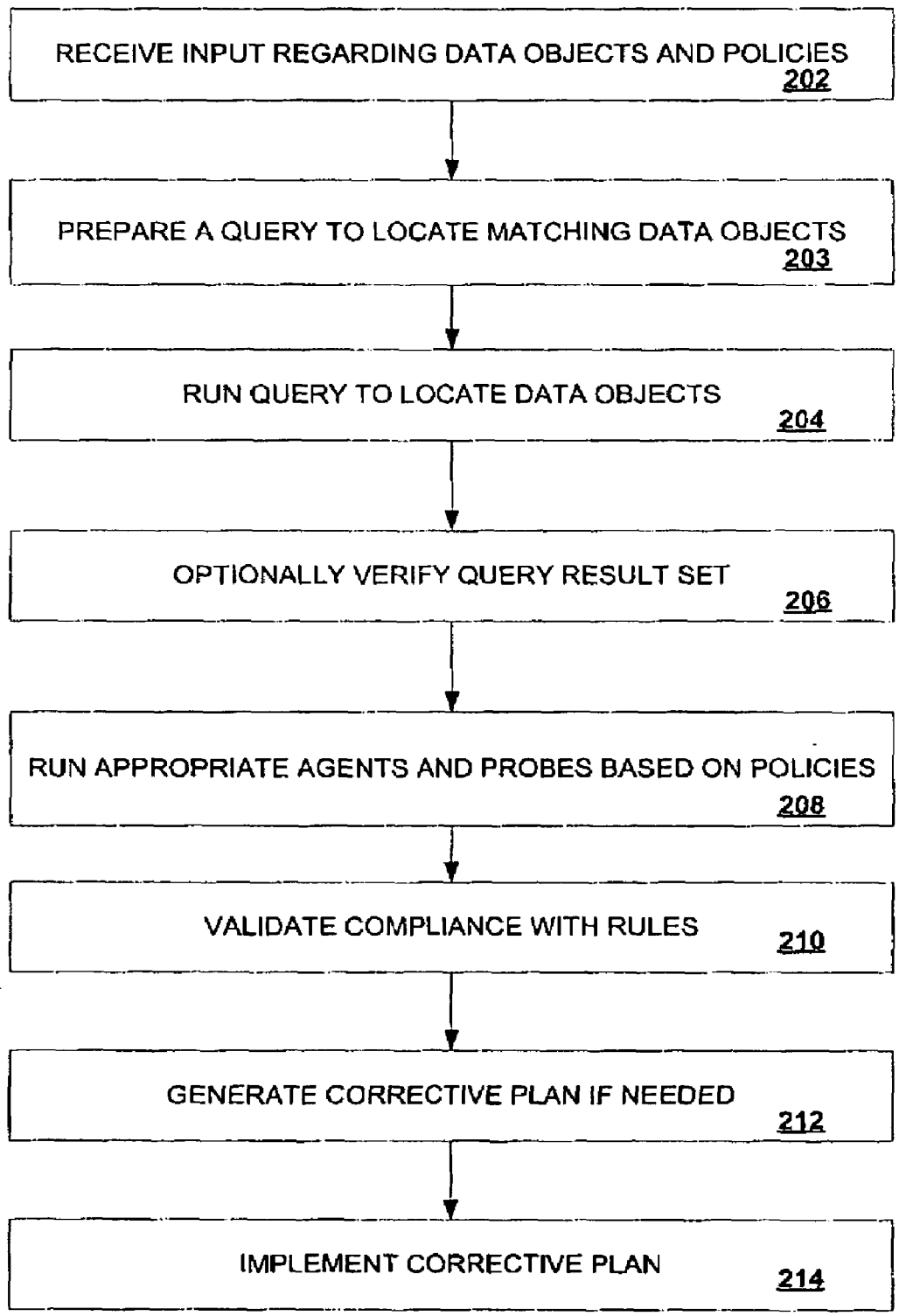
FIG. 2 depicts a flowchart of exemplary method for policy-based storage resource management within the exemplary environment of FIG. 1, in accordance with the principles of the present invention.

As described with relation to FIG. 2, the application 104, manages the data objects that are stored on the different storage devices 112, 114, 116, 122, 118 and 123 according to a set of specified rules or policies. The application 104 performs such management on existing legacy data and also in an ongoing manner as data or policies are updated or changed.

To perform these operations, the application 104 is made aware of the different storage devices that are available to be managed. In some instances, this awareness may be automatic through device probing and, in other instances, user intervention is relied upon to identify the available system resources.

FIG. 2 depicts a flowchart 200 of an exemplary method for policy-based storage resource management, within the exemplary environment of FIG. 1, in accordance with the principles of the present invention. According to the flowchart 200 a users is able to provide input regarding data storage policies, afterwards, this input is then processed by the system application 104.

As known to one of ordinary skill, a user interface is provided to a user to simplify both the selection of data storage objects and the specification of policies to apply to those objects. Typical interface elements such as radio buttons, text-entry boxes, drop-down menus, etc. permit the user to specify matching criteria for data objects from among existing, legacy data with varying level of details. For example, the user may wish to query for data objects by their type; such as, for example, JPEG files, .dbx, files, .doc files, etc. In addition, or alternatively, the user may specify data objects according to the software application that utilizes them. For example, the user may desire to specify all files that are used by SAP™ or some other application.

Other levels of detail for identifying data objects are expressly contemplated within the scope of the present invention. As an example, the user may specify that all data objects related to a certain individual or certain business organization be selected. In this latter example, the matching data objects may be located not just on a single device but on a variety of different, distributed data storage devices.

In addition to querying for matching data objects, the user also uses the interface to specify the policies to be applied to the matching data objects. As mentioned previously, policies may be very broad in application and can relate to almost any imaginable aspect of data objects. Furthermore, the present invention does not explicitly require any particular format for specifying policies or rules for managing data objects. Instead, any of the current, or yet to be developed, methods for defining and specifying policies and rules related to data objects is contemplated within the scope of the present invention.

The following examples of policy types are provided by way of example and are not intended to limit the scope of the present invention as other specific policy types and rules can also be used. Some example policy types include:

Performance policies: data will be available within certain specified time limits (i.e., within 48 hours).

Duplication policies: data may be prohibited from being copied; or the number, or location, of copies may be limited.

Availability policies: data may be required to be available at a certain rate (i.e., 99.9%), thus available copies through different network access points may be required so that there is no single point of failure. Also noteworthy is that as legacy systems fail or become unsupported, data may need to be modified to adhere to these policies.

Security policies: data may be limited to residing on systems having particular levels of security, limited connectivity, user authentication, logging, etc.

Expiration policies: data may need to be moved once it has aged a certain amount. This may entail deleting the data or migrating it to different storage platforms.

Embodiments of the present invention contemplate that a number of different selections may be simultaneously specified by the user. For example, using a single interface screen (or series of screens) the user may specify a number of independent rules and policies that apply to different data-object types.

In addition to the above-discussed storage device characteristics that can be specified in policies and rules, some additional examples are provided below. For example, a user may specify that all files from Excel™ are stored on WORM drives (or R/W optical drives). Additionally, a policy may be created by a user that all files from PowerPoint™ shall be stored on devices that have a latency of less than 0.5 milliseconds. Other storage device characteristics that may be specified within management policies can relate to a wide variety of aspects such as storage media security characteristics, storage media future growth characteristics, storage media availability characteristics, storage media disaster recovery characteristics. These policies are applicable to existing legacy data and can also be utilized in future management of the data objects and storage resources.

In step 203, the system prepares a query based on the input received from the user in step 202. If the user is able to specify the desired data objects with specificity (i.e. "all files with .dbx extension"), then the generation of a query is straightforward. However, embodiments of the present invention contemplate more general queries as well. For example, using existing natural language processing techniques and query generation methods, embodiments of the present invention contemplate handling user input that is of a general nature such as, for example, a rule that requires that all recorded deeds shall be deleted after a particular expiration date. Thus, the system will, in step 202, develop a query that effectively searches for the data objects related to recorded deeds that have exceeded the specified expiration date. Another example, is that a user may specify a particular document or file and request that "similar" data objects be located and managed in a particular manner. Yet another example is that a user may specify that all files related to a particular application (e.g., SAP™) be located. In such an example, the data dictionary, or similar resource, for that application may be searched to identify what file types are used by the application before an appropriate query can be generated.

Once the query is developed, in step 203, then the data-objects matching the query are located in step 204 and presented to the user. As would be known to one of ordinary skill in this art, a variety of different techniques exist for searching the different storage devices for data objects matching the query. Embodiments of the present invention explicitly contemplate that in some instance, the data objects may have been previously indexed to simplify searching and, in other instances, an index may not exist.

Although automatic query generation and retrieval greatly simplifies the locating of relevant data objects and permits the present invention to be scalable to large and/or federated systems, the query results may not always be perfect. Thus, in step 206, an advantageous (but not necessarily required) step is contemplated in which a user is allowed to review the data objects returned by the system's query. This step provides at least two advantages. The user may select certain returned data-objects as non-relevant or mis-identified and have them removed from the result set before the policy rules are applied. Also, the user may from experience know that the result set is "missing" a number of data-objects that the user expected to be retrieved and, therefore, the user can review the query and determine if corrections should be made.

In step 208, the respective storage devices for each of the matching data objects is probed by the system to determine if that storage device satisfies the one or more policies for the data object. Newer storage devices will typically require less specialized software agents than legacy or proprietary systems. For example, Simple Network Management Protocol (SNMP) may be used with such enabled devices to probe response time, network availability and other aspects of the device. Thus, the system would use existing protocols to probe such storage devices (if implicated by the applicable policies). Similarly, the underlying software control application of a hierarchical storage management system may be relied on to provide an interface to query regarding aspects of the data stored therein. Many modern storage devices such as storage area networks, RAID servers and the like include some form of storage resource manager than is designed to easily communicate with other applications so that the operation and capability of that storage system can be readily verified. In some instances, however, certain legacy devices may not have automated communication agents that can be probed. In these instances, specific agents would be implemented on that management system as well as the legacy storage device to allow probing of the storage device. One of ordinary skill will appreciate that there are a wide variety of techniques to accomplish such a task and that embodiments of the present invention are not limited to any specific communication protocol, method or technique. Some of the probes may be a one-shot test while others require repetitive monitoring, all depending on the type of resource management checks that are to be performed.

The particular type of probing that occurs to each storage device is dependent on the policy that applies to the data objects residing on that storage device. As discussed earlier, there is a tremendous number of different policies and rules that may be applied to data objects and, thus, there are just as many different types of potential probing that can occur. Furthermore, probing is not merely limited to identifying hardware and software characteristics of different storage devices but may be used to identify data-related properties such as, for example, file system creation time, or database table modification time, etc. For example, some of the policies may be applied at a file system level (i.e., file creation time), or at an application level (i.e., a particular database integrity constraint), and other policies may be applied at the block level (i.e., each data block is encrypted). Thus, probes of different levels of applicability are contemplated within the scope of the present invention. In general terms, the system generates probes to determine if the legacy data system satisfies the imposed policy requirements. Below are some specific examples of how these probes may be used but numerous other probes and agents may be used without departing from the scope of the present invention.

a. The system may need to check that data is physically deleted (not simply marked for deletion). The system would try to perform a delete operation on the storage device and then subsequently read the affected blocks to assess whether the data is actually deleted.

b. The system may need to ensure the data resides on write-once media. To test this condition, the system may attempt to update a particular location on the storage device to determine whether the operation was successful.

c. If the system policy requires that data be deleted after a certain time, then data can be created and then monitored to see if it is deleted upon expiration of the time period.

d. The system may need to determine the performance characteristics of the storage device (i.e. tape or SCSI or ATA disks)

e. As another example, the system may probe to determine the availability characteristics such as whether active-active failover support is provided.

In step 210, the results of the different probes are collected and analyzed to determine if any of the policies are being violated. If no violations exist, then no further action is required. However, the different agents and probes can continue to monitor data objects according to the policies and rules to ensure that no future violations occur. Such continued monitoring can occur according to a scheduled periodic basis or in response to an event such a particular file being created or changed.

If violations are found to exist in step 210, then further action is required. In step 212, the different data storage devices available are analyzed to determine if any of them could store the data objects within the parameters of the policy requirements so that a corrective plan can be generated. The corrective plan may, for example, identify data objects to migrate to another data storage device. Alternatively, the plan may identify configuration settings that could be changed to bring a data storage device into compliance with the policy requirements. According to certain embodiments of the present invention, the system identifies what functionality should be present in the agents deployed to help prevent future policy violations.

Once the corrective plan is generated in step 212, then the plan can be implemented in step 214. In some instances, the plan can be automatically implemented without user intervention. In other instances, the system may present the plan to a user and then implement it after express approval is received. In yet other instances, the plan may generate competing or ambiguous actions and, therefore, require user interaction before being implemented.

CONCLUSION

A system and method has been shown in the above embodiments for the effective implementation of a Policy Based Resource Management for Legacy Data. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., SANs, NAS, Internet, WWW, wireless web). All programming and data related thereto are stored in computer memory, static or dynamic, and may be retrieved by the user in any of: conventional computer storage, display (i.e., CRT) and/or hardcopy (i.e., printed) formats.

What is claimed is:

1. A computer-based method for implementing policy-based management for legacy data comprising the steps of:
   receiving an input;
   preparing a query to locate one or more data objects that match said received input;
   executing said query and locating said one or more data objects;
   identifying a policy associated with said identified one or more data objects, each data object stored on a respective associated storage device among a plurality of different storage devices, said plurality of different storage devices comprising combinations of: storage device in a storage area network (SAN), network attached storage (NAS), legacy storage device, or a remotely located storage device;
   probing each associated storage device and determining at least one property related to the policy, said property comprising any of the following: a block-level functionality associated with encrypted data blocks, a file system-level functionality comprising a file system creation time, and an application-level functionality associated with a database integrity constraint;
   identifying any associated storage devices in which the at least one property violates the policy;
   outputting any identified storage devices in which that at least one property violates the policy
   identify an additional storage device having the one property that satisfies the policy; and
   migrating those data objects, stored on associated storage devices in which the at least one property violates the policy, to the additional storage device.

2. The method of claim 1, further comprising the step of:
   receiving input related to particular data characteristics; and
   determining the one or more data objects based on the particular data characteristic.

3. The method of claim 2, wherein the step of determining the one or more data objects further includes the steps of:
   generating a query based on the input; and
   searching the respective associated storage devices for data objects matching the query.

4. The method of claim 3, wherein the step of generating the query further includes the step of:
   semantic processing the input to generate the query.

5. The method of claim 3, wherein the step of searching further includes the step of:
   receiving an example data object and determining similar data objects.

6. The method of claim 1, further comprising the step of:
   presenting the one or more data objects to a user;
   receiving input from the user based on the one or more data objects; and
   determining whether to omit at least one of the one or more data objects based on the input.

7. The method of claim 1, further comprising the steps of:
   identifying an additional storage device having the one property that satisfies the policy; and
   moving those data objects, stored on associated storage devices in which the at least one property violates the policy, to the additional storage device.

8. The method of claim 1, further comprising the steps of:
   identifying a configuration change for the associated storage devices in which the at least one property violates the policy; and
   implementing the configuration change such that the at least one property is no longer violated.

9. A computer-based system for policy-based management for legacy data comprising the steps of:
   an application configured to receive an input, prepare a query to locate one or more data objects that match said received input, execute said query and locate said one or more data objects, and identify a policy associated with said identified one or more data objects, each data object stored on a respective associated storage device among a plurality of different storage devices, said plurality of different storage devices comprising combinations of: storage device in a storage area network (SAN), network attached storage (NAS), legacy storage device, or a remotely located storage device;

an probe configured to probe and determine for each associated storage device at least one property related to the policy, said property comprising any of the following: a block-level functionality associated with encrypted data blocks, a file system-level functionality comprising a file system creation time, and an application-level functionality associated with a database integrity constraint; and the application further including an analyzer in communication with the probe and configured to identify any associated storage devices in which the at least one property violates the policy and the application: outputting any identified storage devices in which the at least one property violates the policy, identify an additional storage device having the one property that satisfies the policy; and migrating those data objects, stored on associated storage devices in which the at least one property violates the policy, to the additional storage device.

10. The system of claim 9, further comprising:
a user interface configured to receive input related to particular data characteristics; and
a query generator configured to determine the one or more data objects based on the particular data characteristic.

11. The system of claim 10, wherein the probe is further configured to identify an additional storage device having the one property that satisfies the policy, and the application is further configured to move those data objects, stored on associated storage devices in which the at least one property violates the policy, to the additional storage device.

12. An apparatus for implementing policy-based management for legacy data, the apparatus comprising:
at least one processor;
a memory coupled with the at least one processor;
one or more data objects, each data object stored on a respective associated storage device among a plurality of different storage devices, said plurality of different storage devices comprising combinations of: storage device in a storage area network (SAN), network attached storage (NAS), legacy storage device, or a remotely located storage device; and
a program code residing in the memory and executed by the at least one processor, the program code configured to:
receiving an input
preparing a query to locate one or more data objects that match said received input;
executing said query and locating said one or more data objects;
identify a policy associated with said identified one or more data objects;
probing each associated storage device and determine at least one property related to the policy, said property comprising any of the following: a block-level functionality associated with encrypted data blocks, a file system-level functionality comprising a file system creation time, and an application-level functionality associated with a database integrity constraint;
identify any associated storage devices in which the at least one property violates the policy;
identify an additional storage device having the one property that satisfies the policy; and
migrate those data objects, stored on associated storage devices in which the at least one property violates the policy, to the additional storage device.

13. A program product for implementing policy-based management for legacy data, comprising:
computer readable program code receiving an input, preparing a query to locate one or more data objects that match said received input, executing said query and locating said one or more data objects, and identifying a policy associated with said identified one or more data objects, each data object stored on a respective associated storage device among a plurality of different storage devices, said plurality of different storage devices comprising combinations of: storage device in a storage area network (SAN), network attached storage (NAS), legacy storage device, or a remotely located storage device;
computer readable program code probing and determining for each associated storage device at least one property related to the policy, said property comprising any of the following: a block-level functionality associated with encrypted data blocks, a file system-level functionality comprising a file system creation time, and an application-level functionality associated with a database integrity constraint;
computer readable program code identifying any associated storage devices in which the at least one property violates the policy;
computer readable program code identifying an additional storage device having the one property that satisfies the policy; and
computer readable program code migrate those data objects, stored on associated storage devices in which the at least one property violates the policy, to the additional storage device.

* * * * *